N. S. BROWN & J. MALONEY.
APPARATUS FOR TYING KNOTS.
APPLICATION FILED NOV. 6, 1909.
1,046,959.
Patented Dec. 10, 1912.
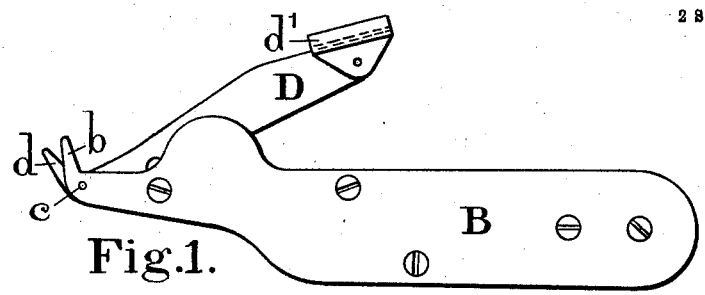
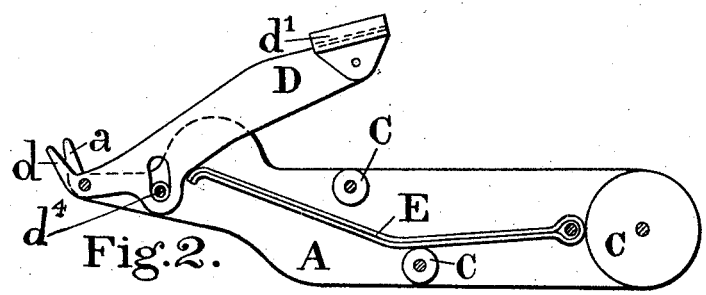
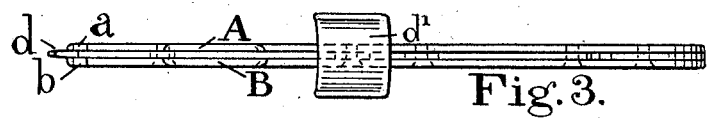
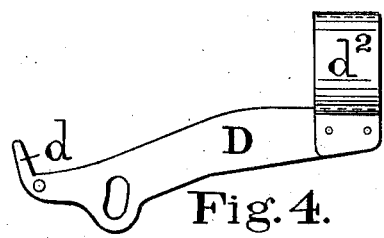
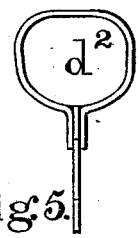
WITNESSES.
INVENTORS.
Norman S. Brown
John Maloney
By James L. Norris N. S. BROWN & J. MALONEY.
APPARATUS FOR TYING KNOTS.
APPLICATION FILED NOV. 6, 1909.

1,046,959.

Patented Dec. 10, 1912.

2 SHEETS—SHEET 2.

WITNESSES.

INVENTORS.
Norman S Brown
John Maloney
James L. Norris
Atty

COLUMBIA PLANOGRAPH CO., WASHINGTON, D. C.

UNITED STATES PATENT OFFICE.

NORMAN SEDDON BROWN AND JOHN MALONEY, OF WIGAN, ENGLAND, ASSIGNORS TO WILLIAM THOMAS STUBBS AND JOSEPH HETHERINGTON STUBBS, BOTH OF MANCHESTER, ENGLAND.

APPARATUS FOR TYING KNOTS.

1,046,959.      Specification of Letters Patent.      Patented Dec. 10, 1912.

Application filed November 6, 1909. Serial No. 526,630.

*To all whom it may concern:*

Be it known that we, NORMAN SEDDON BROWN and JOHN MALONEY, British subjects, residing at Wigan, county of Lancaster, England, have invented certain new and useful Improvements in Apparatus for Tying Knots, of which the following is a specification.

This invention relates to improvements in apparatus employed for tying knots in yarns, threads and the like in various processes of manufacturing textiles, of the class in which one blade is pivoted between two fixed blades.

The invention will be fully described with reference to the accompanying drawings forming part of the specification.

Figure 8:
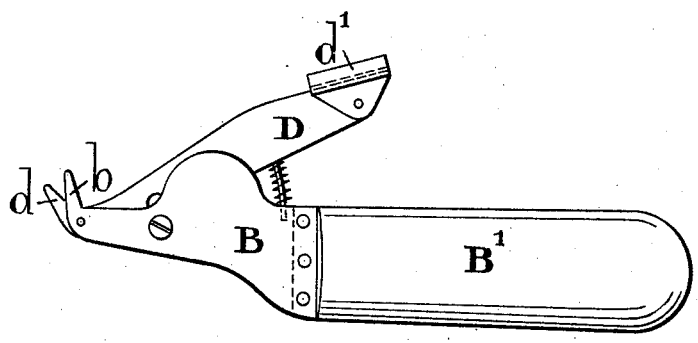
Figure 9:

Figure 1 is a side elevation of the apparatus; Fig. 2, side elevation with one side plate and fixed blade removed; Fig. 3, plan; Fig. 4, side elevation of pivoted plate removed showing a slight modification; Fig. 5, end elevation of same. Fig. 6 shows the various steps in one operation of forming a knot. Fig. 7 shows the various steps in forming a knot by inverting the appliance; Figs. 8 and 9, side elevation and part plan showing modification.

The apparatus is constructed of two plates A and B screwed or riveted together with distance pieces or washers C between them. At the rear the plates form a handle and the other ends $a$ and $b$ are turned up at an angle or shaped to form a beak.

Between the two plates A and B a plate D is pivoted on a pin or stud $c$ the end $d$ of plate D corresponding in shape to the ends $a\,b$ of the plates A and B. The rear end of the plate D is extended toward the handle part of the plates A and B and is provided with a finger plate $d'$ or a loop $d^2$ by which the pivoted plate can be operated. The pin $c$ above referred to passes through the plates A, B and D at the bases of their respective ends or jaws $a$, $b$ and $d$.

The face of the end blade $d$ of the pivoted plate D is beveled so as to form a cutting edge which with the face of the end $a$ of the plate A forms a shears for severing a thread placed across them. The other side of the beveled face $d$ forms with the end $b$ of the plate B a nipper or gripper which seizes and retains hold of the severed ends of yarn and by which such ends are drawn through a loop formed in the yarn around the ends $a$ and $b$, thereby completing the knot after the superfluous yarn or thread has been cut off. The plate D is held normally in open position by a spring E placed between the two plates A and B, such position being determined by the slot $d^3$ formed in said plate D through which slot extends a pin $d^4$ connecting plates A and B.

Instead of making the shearing and gripping ends $a$ and $b$ of the apparatus in one with the plates A and B the shearing and gripping ends may be made separate as shown in Figs. 8 and 9 and rigidly affixed to a handle B' of suitable form.

In operation the appliance is held by the handle in the hand of the operator the thread looped around the ends $a\,b$ and $d$ while still open, the end of the thread being then placed across the blades; this may be done either while the ends are maintained upright or these may be inverted. As shown in Fig. 6 the yarn F is looped around the ends $a\,b$ and $d$ and turned upward across them, the plate D is depressed the yarn gripped between $d$ and $b$ and the superfluous ends $f$ cut off by $a$ and $d$ and while the yarn is held between the ends $d$ and $b$ the loop is drawn off in an upward direction and the knot tied. As shown in Fig. 7 the yarn F is looped around the ends $a\,b$ and $d$ and these are then inverted by a turn of the wrist of the operator to bring the yarn across them, and the plate D is depressed the yarn being gripped between $d$ and $b$ and the superfluous ends cut off by $a$ and $d$ and the gripped yarn is then drawn up through the loop by elevating the apparatus and the knot is thereby tied.

What we claim as our invention and desire to protect by Letters Patent is:—

A knot tier composed of a pair of relatively-movable members, one of which includes a pair of side plates terminating in integral angularly-extending beaks, said side plates being spaced apart and forming a rigid handle, a pivot extending through the bases of said beaks, a pin connecting said side plates adjacent the bases of said beaks, the other member comprising a lever plate pivotally mounted on said pivot to swing between said side plates, and formed with a transverse slot through which said pin extends, whereby its swinging movement in opposite directions is limited, said other member terminating in an integral angularly-extending beak adapted to be brought into registry simultaneously with both beaks of said side plates, and a spring contained between said side plates and acting against said lever plate.

In testimony whereof we have hereunto set our hands in presence of two subscribing witnesses.

N. SEDDON BROWN.
JOHN MALONEY.

Witnesses:
J. OWDEN O'BRIEN,
GEO. H. O'BRIEN.

Copies of this patent may be obtained for five cents each, by addressing the "Commissioner of Patents, Washington, D. C."